(12) United States Patent
Ascher et al.

(10) Patent No.: US 8,577,136 B1
(45) Date of Patent: Nov. 5, 2013

(54) GRID PIXELATION ENHANCEMENT FOR IN-STOCK ANALYTICS

(75) Inventors: Andrew W. Ascher, Plymouth, MN (US); John C. Jones, St. Paul, MN (US)

(73) Assignee: Target Brands, Inc., Minneapolis, MN (US)

( * ) Notice: Subject to any disclaimer, the term of this patent is extended or adjusted under 35 U.S.C. 154(b) by 322 days.

(21) Appl. No.: 12/980,138

(22) Filed: Dec. 28, 2010

(51) Int. Cl.
*G06K 9/00* (2006.01)

(52) U.S. Cl.
USPC .......................................................... 382/165

(58) Field of Classification Search
None
See application file for complete search history.

(56) References Cited

U.S. PATENT DOCUMENTS

| | | | | |
|---|---|---|---|---|
| 4,873,644 | A * | 10/1989 | Fujii et al. | 700/219 |
| 5,095,447 | A | 3/1992 | Manns et al. | |
| 7,124,099 | B2 * | 10/2006 | Mesaros | 705/26.35 |
| 7,689,465 | B1 | 3/2010 | Shakes et al. | |
| 7,693,757 | B2 * | 4/2010 | Zimmerman | 705/28 |
| 2002/0138336 | A1 * | 9/2002 | Bakes et al. | 705/10 |
| 2003/0126103 | A1 * | 7/2003 | Chen et al. | 706/50 |
| 2003/0225635 | A1 * | 12/2003 | Renz et al. | 705/28 |
| 2004/0186794 | A1 * | 9/2004 | Renz et al. | 705/28 |
| 2005/0269412 | A1 | 12/2005 | Chiu et al. | |
| 2006/0237546 | A1 | 10/2006 | Lapstun et al. | |
| 2007/0069867 | A1 * | 3/2007 | Fleisch et al. | 340/309.16 |
| 2007/0239683 | A1 | 10/2007 | Gallagher | |
| 2008/0077511 | A1 * | 3/2008 | Zimmerman | 705/28 |
| 2008/0154747 | A1 * | 6/2008 | Tarbell et al. | 705/27 |
| 2009/0060349 | A1 * | 3/2009 | Linaker et al. | 382/209 |
| 2009/0063307 | A1 * | 3/2009 | Groenovelt et al. | 705/28 |
| 2009/0116747 | A1 | 5/2009 | Duong et al. | |
| 2009/0121017 | A1 * | 5/2009 | Cato et al. | 235/385 |
| 2009/0192921 | A1 * | 7/2009 | Hicks | 705/28 |
| 2009/0204512 | A1 * | 8/2009 | Connell et al. | 705/28 |
| 2009/0281925 | A1 * | 11/2009 | Winter et al. | 705/27 |
| 2010/0023250 | A1 | 1/2010 | Mays et al. | |
| 2010/0037176 | A1 | 2/2010 | Engeln et al. | |
| 2011/0011936 | A1 * | 1/2011 | Morandi et al. | 235/454 |

OTHER PUBLICATIONS

Lorusso, Anthony, Construction of a Machine Vision System for Autonomous Applications, May 1996, 145 pgs.

* cited by examiner

*Primary Examiner* — Barry Drennan
*Assistant Examiner* — Feng Niu
(74) *Attorney, Agent, or Firm* — Nixon & Vanderhye P.C.

(57) ABSTRACT

Disclosed herein are methods and systems for presenting product stock information. In some implementations, an image of a portion of a retail store is received from a camera and analyzed to divide the image into macroblocks. Each of the macroblocks can be associated with one or more product facings associated with products placed on a shelf in the retail store. A color from the macroblock is optionally identified and compared to a product color or a shelf color to determine a stock level of the product. In some implementations, a reporting module presents the stock level in a graphical user interface to a user.

20 Claims, 7 Drawing Sheets

GRID PIXELATION ENHANCEMENT FOR IN-STOCK ANALYTICS

BACKGROUND

Consumers purchase products in retail stores and online over the Internet. Shopping at a retail store sometimes allows consumers the ability to use interactive displays of products or use products before the consumer completes a purchase. Shopping online allows consumers to interact with pictures, videos, and/or audio clips relating to the products the consumer is considering for purchase. Retail store employees often provide help in selecting what type of product a consumer is looking for or what features the product should have.

Point of sale systems allow consumers to purchase products from retail stores. Store employees sell products to consumers by ringing up a sales transaction; either after assisting the consumer in locating a product or after the consumer locates a product without assistance. Point of sale systems scan universal product codes (UPC) in order to determine the price of products and add the product and associated price to the sales transaction. After all products have been added to a transaction, the point of sale system adds sales tax for the appropriate products. Consumers pay for products and sales tax at a point of sale system using cash, checks, or credit cards.

Inventory tracking systems allow retail businesses to keep track of inventory and determine when additional products need to be ordered. Some electronic inventory tracking systems communicate with point of sale systems and warehouses to keep track of the product inventory at retail stores. When stock levels of products fall below a predetermined level, additional stock can be requested from a warehouse. Electronic inventory tracking systems track sales and returns of products over time. Sales and return data is analyzed to determine trends, such as sales volume during different times of the year. Inventory systems can update stock levels throughout the year in order to adjust for changes in sales volume. Sometimes employees of a retail store manually scan all products of the retail store in order to verify the actual stock levels of products and to update product stock information in the inventory tracking system.

Retail stores sometimes use surveillance cameras to observe properties for safety and security purposes. Conventional surveillance cameras capture video images of an area, such as a section of a room, an exterior entranceway, or a portion of a department, and transfer the images electronically to a recording device and/or a monitor.

SUMMARY

Disclosed herein are methods and systems for presenting product stock information. In some implementations, an image of a portion of a retail store is received from a camera and analyzed to divide the image into macroblocks. Each of the macroblocks can be associated with one or more product facings associated with products placed on a shelf in the retail store. A color from the macroblock is optionally identified and compared to a product color or a shelf color to determine a stock level of the product. In some implementations, a reporting module presents the stock level to a user in a graphical user interface.

In some implementations, a subset of the macroblocks in an image is selected and the stock levels associated with the subset of the macroblocks are combined to determine a combined stock level for a product with multiple product facings.

In certain implementations, the stock level is compared with a threshold stock level in order to determine if the stock level should be presented to a user.

In some implementations, the stock level is compared to a calculated stock level determined by an inventory system to see if there is a discrepancy between the stock level and the calculated stock level. In some implementations, the stock level is presented to a user based on the comparison of the stock level and the calculated stock level.

In some implementations, additional products can be ordered based on the stock level. For example, if the stock level is below a threshold stock level, a request for additional products can be provided to a vendor. In some implementations, products can be ordered from a vendor for multiple retail stores.

The details of one or more implementations are set forth in the accompanying drawing and description below. Other features, objects, and advantages will be apparent from the description and drawings, and from the claims.

DESCRIPTION OF DRAWINGS

Like reference symbols in various drawing indicate like elements.

DETAILED DESCRIPTION OF ILLUSTRATIVE IMPLEMENTATIONS

Figure 1:
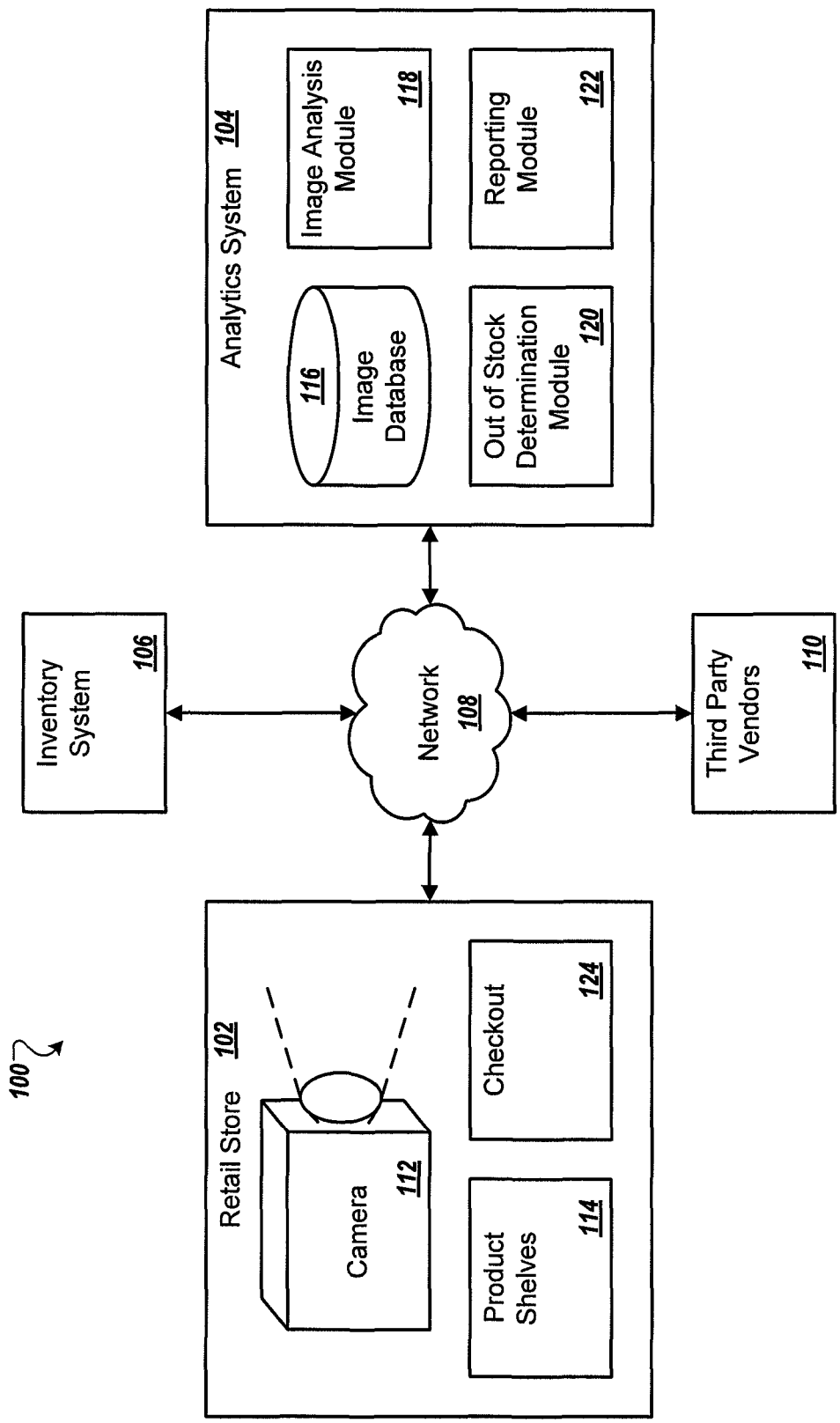
FIG. 1 shows an example of a supply chain environment for determining product inventory at a retail store.

Cameras used in a retail environment provide images of product shelves to an analytics system, where the images include pictures of one or more products stocked on the shelves. The analytics system extracts information from the images to determine the quantity of the products stocked on the shelves and presents the stock quantity in a graphical user interface.

In some implementations, the analytics system divides the image into a plurality of macroblocks and performs analysis on each of the individual macroblocks. As used herein, a macroblock is composed of two or more pixels (e.g., a block of pixels) from the image. The size of a macroblock is based on a product facing associated with the macroblock and is optionally expressed as an actual image size (e.g., 8×8 pixels).

As used herein, a product facing refers to the amount of space a product uses when placed on a shelf. For example, a product with a height (h) and a width (w) has a product facing with a height of about (h) and width of about (w). In a specific example, the product facing has a height of (h)+1" and a width of (w)+½" depending on the actual size of the product and/or product packaging.

The analytics system determines a principal color of each of the macroblocks, where the principal color occurs more frequently in the macroblock than any other colors. For example, if a macroblock is 4×4 pixels, where two pixels are cyan, one pixel is teal, and one pixel is indigo, then the principal color of the macroblock is cyan.

The analytics system compares the principal color of each macroblock with a product color of the product associated with the macroblock and with a shelf color of the shelves holding the product in order to determine a current stock level of the product. For example, the analytics system compares the principal color with the shelf color to determine if a product is on the shelf or not. The analytics system determines, for example, that there are no products on a shelf if the principal color of a macroblock and the shelf color are the same.

In some implementations, the analytics system compares the principal color with the product color to determine if there is a product associated with the product color on the shelf. For example, the analytics system determines that another product is on the shelf if the principal color is different from the product color and the shelf color.

In certain implementations, the analytics system determines an out of stock percentage associated with a product based on the principal colors of the macroblocks associated with the product. The out of stock percentage typically indicates the percentage of macroblocks associated with the product that have a principal color that is not the same as the product color. In some implementations, the out of stock percentage is based on the number of macroblocks associated with a product that have a principal color that is the same as the shelf color.

In one example, the analytics system divides each macroblock into sub-macroblocks with a size smaller than the respective macroblocks. For example, each sub-macroblock is a single pixel. The analytics system can compare the color of each sub-macroblock with the product color to determine an out of stock percentage associated with a specific product.

A current stock level for a particular product is optionally compared to a maximum stock level of the product for purposes of determining a number of outs of the product. For example, the current stock level is used to determine the number of outs, or empty spaces, on the shelf where the product can be placed. The number of outs is used to determine a quantity of the product to order from a vendor.

FIG. 1 shows an example of a supply chain environment 100 for determining product inventory at a retail store 102. The retail store 102 provides images to an analytics system 104 that analyzes the images and determines product inventory information based on the images.

The analytics system 104 optionally communicates with an inventory system 106 across a network 108 to determine the number of products purchased at the retail store 102. The analytics system 104 also communicates with the inventory system 106 to determine whether a variance exists between the inventory information and the products purchased based on the images and the number of products purchased at the retail store 102.

In some implementations, the analytics system 104 orders additional products from one or more third party vendors 110 based on the inventory information. The third party vendors 110 physically provide the ordered products to the retail store 102. In certain implementations, the third party vendors 110 provide product replenishment based on information accessed in the analytics system 104, the inventory system 106, an external system, or some combination of any or all of the above systems.

The network 108 is a wide area network, such as the Internet. In some implementations, the network 108 includes multiple networks. For example, a local area network connects the retail store 102, the analytics system 104, and the inventory system 106 while a wide area network connects the third party vendors 110 with the analytics system 104 and the inventory system 106. In some implementations, a local area network includes an intranet that connects a plurality of businesses together. For example, the intranet connects multiple retail stores or databases that are owned or associated with the same company to the analytics system 104 and the inventory system 106.

The retail store 102 includes a number of cameras 112, such as internet protocol (IP) cameras. In some implementations, each camera 112 represents a fixed camera that captures images of a fixed physical region of the retail store 102. In some implementations, the camera 112 is an articulating camera that provides pan, tilt, and zoom (PTZ) functionality and captures images of multiple physical regions of the retail store 102.

Each individual camera in the retail store 102 is identified based on a unique IP address associated with the particular camera. Some examples of camera systems with multiple cameras include Omnicast Video Surveillance Systems, Lorex Technology Video Surveillance Systems, and Axis Communications Video Surveillance Systems. Other camera systems can be implemented or combined in the retail store 102.

The camera 112 captures images of one or more product shelves 114 located in the retail store 102 in order to capture a snapshot of the products placed on the product shelves 114 at a particular point in time. For example, the camera 112 captures an image of the product shelves 114 and stores the image in an image database 116 located in the analytics system 104. In some implementations, the image database 116 is a file system. Alternatively, the image database 116 is another type of database.

In some implementations, the images are grouped in the image database 116 according to the physical region of the retail store 102 associated with the images and/or the time and date that the images were captured. For example, the camera 112 captures the images according to a schedule (e.g., every hour, every thirty minutes, etc.) and the images are stored in the image database 116 according to the time of capture.

Each captured image includes an image identifier associated with the region of the retail store 102 captured in the image. The image identifier allows the analytics system 104 to identify properties associated with the image, such as the product facings shown in the image and the color of the shelf the products are resting on.

For example, when the camera 112 does not have PTZ functionality, the image identifier is the IP address of the camera 112. In another example, when the camera 112 has PTZ functionality, the image identifier is typically based on the IP address of the camera 112 and the physical region of the retail store represented in the image. For example, if the camera 112 captures twelve unique images, the identifier of the first image is the camera's IP address with ":0" appended to the end, the identifier of the second image is the camera's IP address with ":1" appended to the end, and so on.

An image analysis module 118, included in the analytics system 104, retrieves an image from the image database 116 and divides the image into macroblocks. The macroblocks represent product facings of the products placed on the product shelves 114, as described in more detail below with reference to FIGS. 4A-C. For example, the image analysis module 118 divides the retrieved image into a grid with rows and columns of macroblocks based on the image identifier of the retrieved image. Each macroblock in this example represents a single facing of a product. Some examples of the image analysis module 118 include GNU Image Manipulation Program (GIMP), ACD Canvas, and Adobe Photoshop.

The image analysis module 118 analyzes each of the macroblocks in the retrieved image and determines a principal color of each of the macroblocks. For example, the image analysis module 118 identifies a principal pixel color that occurs most frequently in a macroblock and associates, in the image database 116, the macroblock with information about the principal color (e.g., the name of the color or the RGB values associated with the color).

In some implementations, when the frequency of two or more colors in a macroblock is the same or similar, the image analysis module 118 determines that there are multiple principal colors associated with the macroblock. For example, if the frequency of salmon and fallow in a macroblock are within a threshold distance from each other (e.g., between about 0 and about 10% apart), the image analysis module 118 associates the macroblock with the names of both colors in the image database 116.

In certain implementations, the image analysis module 118 divides each macroblock into blocks (e.g., sub-macroblocks) and identifies a color associated with each of the blocks. The image analysis module 118 associates the colors of the blocks with the macroblock in the image database 116, for example, by associating the occurrence of each color in the macroblock with color information.

An out of stock determination module 120 retrieves an image from the image database 116 and information associated with the retrieved image. For example, the out of stock determination module 120 retrieves the grid layout of the macroblocks associated with the image, the product colors associated with the product facings represented by the macroblocks, and the shelf color or colors associated with the images of the product shelves 114 in the retrieved image. Some examples of the out of stock determination module 120 are implemented in MySQL, Microsoft Office Access, or DB2.

In some implementations, the image analysis module 118 associates the product colors and the shelf colors with the retrieved image when dividing the retrieved image into macroblocks. In some implementations, the out of stock determination module 120 uses the image identifier associated with the retrieved image to identify (i) one or more products associated with the product facings in the retrieved image, (ii) the colors of the products, and (iii) the colors of the shelves the products are displayed on.

For each macroblock, the out of stock determination module 120 compares the principal color of the macroblock with the color of the product associated with the macroblock and/or the color of the shelf that supports the product in order to determine a current stock level or stock quantity of the product. For example, the out of stock determination module 120 determines that the principal color of the macroblock is the same as the product color associated with the macroblock. Such a determination is used to decipher whether the product is in stock and currently residing in the physical product facing associated with the macroblock. In another example, the out of stock determination module 120 determines that the principal color of the macroblock is the same as the shelf color and that the product is not in stock.

In another example, the out of stock determination module 120 compares the principal color of a macroblock to both a product color and a shelf color. For example, if the principal color is the same as the shelf color or the product color, the out of stock determination module 120 determines that the product is out of stock or in stock respectively. Alternatively, if the principal color of the macroblock is different from the shelf color and the product color, the out of stock determination module 120 determines that another product was incorrectly placed on the shelf. In some implementations, an employee of the retail store 102 receives a message indicating that the other product was incorrectly placed on the shelf so that the employee moves the other product to a correct shelf location.

A reporting module 122 presents the current stock level of the product to a user in a graphical user interface (GUI). For example, the reporting module 122 presents the current stock levels associated with all products in a retrieved image on a monitor. Some examples of the reporting module 122 are implemented in Microsoft Office Access, GNU Enterprise, and MySQL Enterprise Monitor.

In some implementations, the reporting module 122 presents the current stock levels on demand in response to input from a user. In some implementations, the reporting module 122 generates reports of current stock levels according to a predetermined schedule. For example, the camera 112 captures an image of a shelf once every hour, the image analysis module 118 analyzes the captured image after the image is taken, and the out of stock determination module 120 analyzes the image data identified by the image analysis module 118. Once the inventory data is determined by the out of stock determination module 120, the reporting module 122 generates a report for presentation to a user.

In some implementations, the schedule of the camera 112 is different from the schedule of the reporting module 122. For example, the camera 112 captures images of the product shelves 114 every thirty minutes and the reporting module 122 generates a report according to a different schedule, e.g., prior to a high traffic time period at the retail store 102, e.g., before a lunch rush.

In some implementations, the report is generated based on the current stock of the product and a maximum stock of the product. For example, when the inventory of a specific product is at 95% of the maximum inventory, a report is not generated, and when the inventory of the specific product falls below a threshold percentage value, e.g., 75%, a report is generated for the specific product. In another example, a report is generated for a product when the inventory of the product is less than a product specific threshold value. For example, a product that has a maximum stock of 100 will have a greater threshold stock value than another product that has a maximum stock of 50.

In some implementations, when a customer purchases a product from a checkout 124 at the retail store 102, the checkout 124 provides the inventory system 106 with a message or update regarding the purchased product. For example, when a customer purchases a loaf of bread, the associated inventory of the type of bread purchased is adjusted accordingly at the inventory system 106.

In some implementations, the reporting module 122 receives a calculated stock level for a product from the inventory system 106 before generating a report with the current stock level of the product. For example, the reporting module 122 retrieves the current stock level of the product from the image database 116 and requests the calculated stock level for the product from the inventory system 106. The reporting module 122 presents both the current stock level and the calculated stock level in an online or offline GUI so that a user may compare the current and calculated stock levels.

In some implementations, when the calculated stock level is different from the current stock level, the analytics system 104 provides the inventory system 106 with the current stock level and the inventory system 106 updates the calculated stock level accordingly. For example, when the retail store 102 is closed, the analytics system 104 determines the stock levels for some or all of the products sold by the retail store 102 and provides the inventory system 106 with the stock levels. The inventory system 106 updates the recorded stock levels (e.g., based on customer sales) with the stock levels determined by the analytics system 104 so that an appropriate amount of products are ordered from the third party vendors 110 and the retail store 102 does not run out of any particular product.

In some implementations, the analytics system 104 and/or the inventory system 106 requests additional products from one or more of the third party vendors 110. For example, the GUI presented by the reporting module 122 includes a user selectable option to order additional products from the third party vendors 110. For example, when only 25% of a specific type of product is in stock then the reporting module 122 presents a user with an option to order additional quantity of the product (e.g., 75% of the maximum stock level). Based on the order received from the reporting module 122, the third party vendors 110 provide the requested quantities of product to the retail store 102.

The reporting module 122 presents an order confirmation message in the GUI indicating that the additional products have been ordered from the third party vendors 110. The GUI, for example, presents the confirmation message with the order quantity and the current stock level of the product.

The analytics system 104 optionally requests the order quantity of the product from the third party vendors 110 based on a comparison of the order quantity and a threshold order quantity. For example, the reporting module 122 determines that the order quantity associated with a product is above a threshold order quantity associated with the product and the reporting module 122 requests the product from the third party vendors 110.

In some implementations, when the analytics system 104 and/or the inventory system 106 communicate with multiple retail stores, the analytics system 104 requests additional products for multiple retail stores. For example, the order request includes information identifying which products to ship to which store and the quantities associated with the products.

In certain implementations, when the analytics system 104 orders products for multiple stores, the third party vendors 110 ship the requested products to a central distribution warehouse associated with the multiple stores. The analytics system 104 provides the central distribution warehouse with information indicating the destination of the products and the product quantities to deliver to the destinations.

In one example, the analytics system 104 provides the current stock level of a product directly to a third party vendor that supplies the product to the retail store 102. For example, the third party vendor requests the current stock level in order to determine a quantity of the product to deliver to the retail store 102. In another example, the retail store 102 provides the third party vendor with the current stock level so that the third party vendor can prepare the required product for the retail store 102. For example, if the required product is a baked good, the third party vendor will know how many of the products to bake.

The retail store 102 optionally provides a third party vendor with captured images and an analytics system (e.g., the analytics system 104) located at the third party vendor analyzes the captured images. For example, the analytics system at the third party vendor determines which products provided by the third party vendor need to be shipped to the retail store 102.

In some implementations, the analytics system 104 analyzes images taken at different times in order to determine sales trends. For example, the analytics system 104 analyzes all of the images of the product shelves 114 taken during a day to determine when the product shelves 114 should be restocked in order to prevent products from running out. In these implementations, the reporting module 122 generates reports that indicate when additional products should be delivered to the sales floor from a stockroom or when the third party vendors 110 should schedule deliveries of additional products.

In some implementations, the analytics system 104 orders products from the third party vendors 110 based on trend data determined during analysis of image information in the image database 116. For example, the analytics system 104 automatically requests additional stock of a product from one of the third party vendors 110 without receiving input from a user. The reporting module 122 generates a report for presentation to a user, where the report indicates the products that were ordered from the third party vendors 110.

In certain implementations, the analytics system 104 determines a current shelf stock level of a product different from a backroom stock level of the product. For example, the shelf stock level represents the quantity of the product that is immediately available for purchase by a customer and the backroom stock level represents the quantity of the product that an employee of the retail store 102 would be required to retrieve from a backroom at the retail store 102 before a customer can purchase the product.

In some implementations, the inventory system 106 tracks shelf stock levels separately from backroom stock levels. For example, for each product, the inventory system 106 includes a maximum stock level, a shelf stock level, a backroom stock level, and a calculated stock level (e.g., the shelf stock level plus the backroom stock level). The analytics system 104 requests the shelf stock level from the inventory system 106 for purposes of comparing the current shelf stock level determined from an image with the stock level indicated by the inventory system 106.

In one example, the analytics system 104 combines the current stock level determined from an image with the backroom stock level provided by the inventory system 106 to determine an overall stock level for a product. For example, the analytics system 104 compares the current stock level and the backroom stock level with the maximum stock level in order to determine an out of stock percentage of the product and if additional products should be ordered.

In certain implementations, two or more cameras monitor the product shelves 114 that are located on the sales floor of the retail store 102 and the backroom of the retail store 102. The analytics system 104 analyzes images from the cameras to determine current stock levels for both the sales floor and the backroom. In some implementations, the analytics system 104 determines a single current stock level for both the sales floor and the backroom of the retail store 102.

In some implementations, the image analysis module 118 identifies a threshold number of principal colors associated with a macroblock and the frequency or percentage of pixels associated with the respective color in the macroblock. The image analysis module 118 stores the principal colors and corresponding percentage information in the image database 116 for use by the out of stock determination module 120. In these implementations, the product colors associated with a product include percentage values, and the comparison of the product colors with the principal colors of a macroblock includes a comparison of the corresponding percentage values. If the colors are the same and the corresponding percentages are similar (e.g., within about 0 to about 5%), then the out of stock determination module 120 determines that the macroblock represents an image of the product that is associated with the macroblock.

In certain implementations, the out of stock determination module 120 identifies all macroblocks in an image that are associated with the same product. For example, based on the information associated with the retrieved image, the out of stock determination module 120 identifies a subset of macroblocks in the retrieved image that are associated with a particular product. The out of stock determination module 120 determines the percentage of the subset of macroblocks that indicate the particular product is out of stock based on the principal colors associated with the subset of macroblocks. For example, if 180 macroblocks are associated with one particular product and 10 of the macroblocks indicate that the product is out of stock, the out of stock determination module 120 determines that 6% of the physical product facings do not have products based on the relationship between the macroblocks and physical product facings.

In one example, the out of stock determination module 120 determines an out of stock percentage of the particular product based on a maximum stock level of the particular product. For example, the maximum stock level of a product has a one to one correlation with the number of macroblocks in an image associated with the product.

In another example, there is a direct correlation between the maximum stock level of a product and the number of macroblocks associated with the product. For example, each macroblock represents a product facing, where the product is placed on a shelf five deep. For each macroblock that indicates the product is in stock, the out of stock determination module 120 determines that five of the products are in stock. Similarly, for each macroblock that indicates the product is out of stock, the out of stock determination module 120 determines that five of the products are out of stock.

In some implementations, each macroblock represents multiple product facings in a retrieved image. For example, a single macroblock represents three facings of the same product side by side on one of the product shelves 114. In another example, a single macroblock represents multiple product facings extending back from the front of a shelf. For example, the macroblock represents a first product facing that includes the entire front of the product, a second product facing extending behind the first product facing that includes the top of the product, a third product facing extending behind the second, and so on. Based on the multiple product facings associated with the macroblock and the frequency or percentage of the principal color associated with the macroblock, the out of stock determination module 120 identifies an out of stock percentage for the macroblock. The macroblock out of stock percentage indicates the number of products that are out of stock based on the product facings associated with the macroblock. Additionally, the macroblock out of stock percentage is not based on any other macroblocks in the retrieved image that are associated with the same product.

In certain implementations, the analytics system 104 analyzes multiple images of the same product facings on the product shelves 114. For example, the image analysis module 118 analyzes two or more images of the same shelf in the retail store 102 to determine the principal colors of the two or more macroblocks (e.g., one for each image) associated with a single product facing. The out of stock determination module 120 analyzes all of the macroblocks associated with the single product facing in order to determine a current stock level for the product or an out of stock percentage for the product. For example, when the current stock level is a percentage, the out of stock determination module 120 averages the current stock levels associated with the macroblocks to determine a combined current stock level of the product.

In one example, the product shelves 114 include 180 product facings for a single bakery product. Here the product facings are stacked backward from the front of the shelf such that each product facing represents one position where the bakery product can be placed on the shelf. In this example, a maximum stock level of the bakery product on the product shelves 114 is a quantity of 180.

The camera 112 captures an image of the product shelves 114, including all 180 product facings of the bakery product and stores the image in the image database 116. The image analysis module 118 identifies the 180 macroblocks in the image that are associated with the 180 product facings and the principal colors associated with the 180 macroblocks.

The out of stock determination module 120 analyzes the information associated with the image and determines that 10 of the 180 macroblocks indicate that the bakery product is not located in the respective product facing and that the bakery product has a current stock that is 94% of the maximum stock (e.g., 170/180).

The reporting module 122 uses the current stock percentage of 94% for the bakery product, or alternatively the out of stock percentage of 6%, to determine if a current stock report should be presented to a user. In some implementations, the reporting module 122 orders a quantity of the bakery product from the third party vendors 110 and presents a report associated with the order to a user.

Figure 2A:
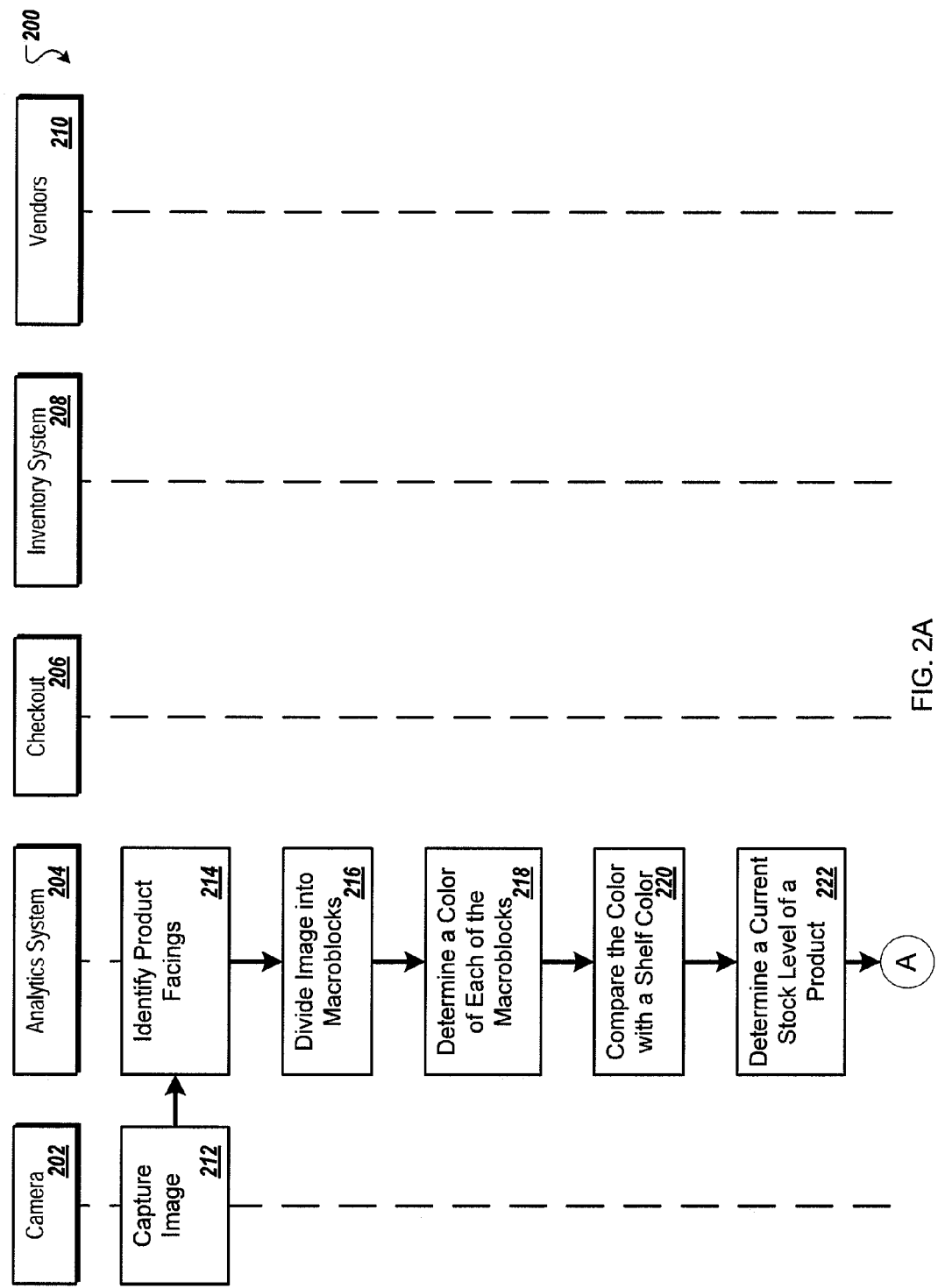
FIGS. 2A-B show a swim lane diagram of an example procedure for ordering products from a vendor.
Figure 2B:
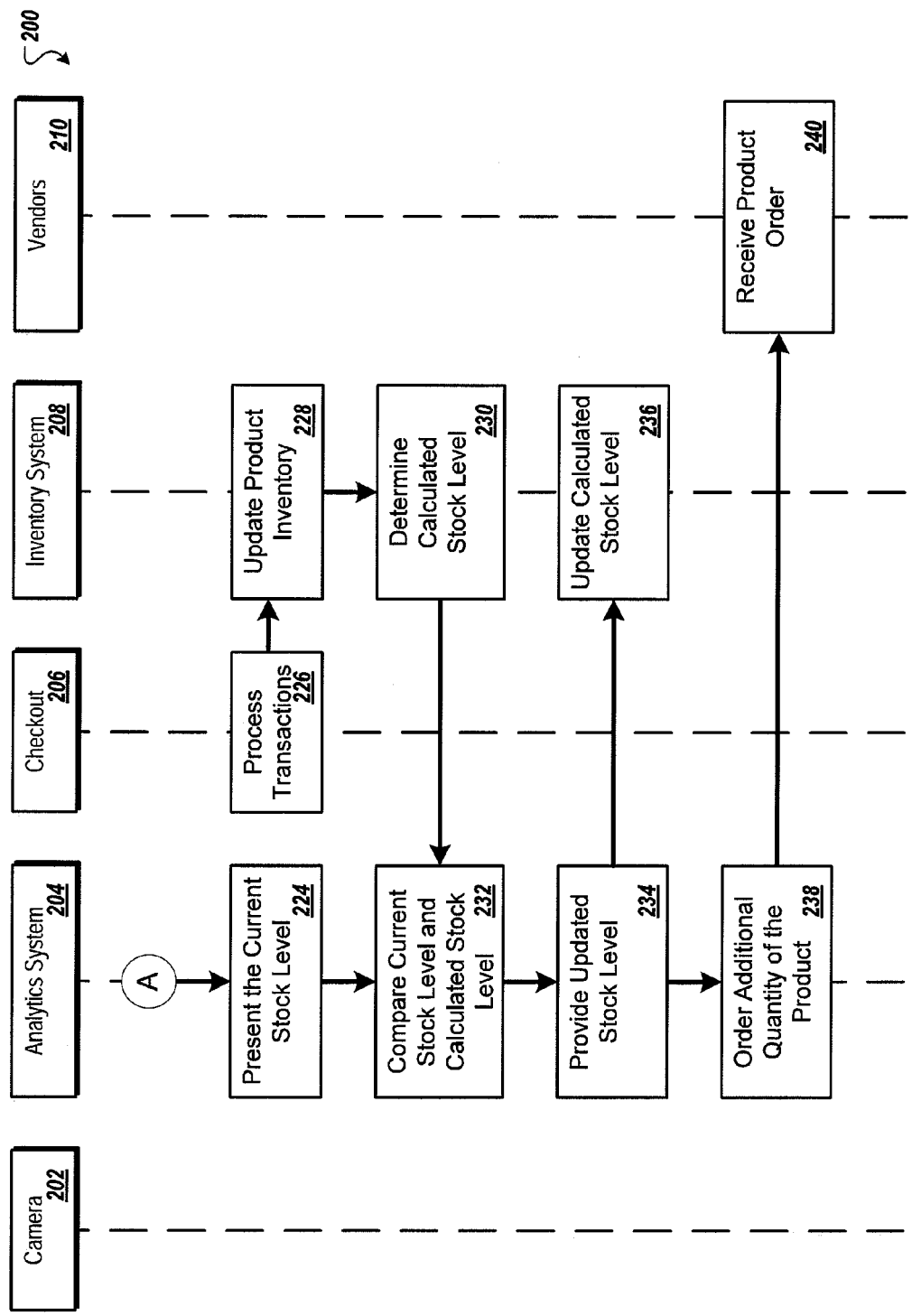

FIGS. 2A-B show a swim lane diagram of an example procedure 200 for ordering products from a vendor. The procedure 200 is used in an environment, such as the supply chain environment 100, to determine a current stock level of a product and if a product order should be placed with a vendor.

A camera 202, located in a retail store, captures images of one or more products in the retail store and provides the images to an analytics system 204. The analytics system 204 analyzes the captured images and determines current stock levels for the products provided by the retail store.

In some implementations, when a customer purchases a product from a checkout 206, product stock level information in an inventory system 208 is updated based on the products purchase. The analytics system 204 optionally compares the current stock levels with the inventory stock levels to identify misplaced or lost products.

The analytics system 204 optionally orders additional products or quantities of products from one or more vendors 210 to replenish the current stock level. The analytics system 204 estimates the number of products needed in the retail store and orders the estimated number from the vendors 210.

In certain implementations, the analytics system 204 communicates with multiple retail stores. For example, the analytics system 204 is located in a central distribution warehouse and receives images from cameras associated with the retail stores that take delivery of products from the central warehouse. The analytics system 204 communicates with the retail stores, the inventory system 208, and the vendors 210 to ensure that the retail stores receive products in a timely manner. For example, the analytics system 204 facilitates delivery of products from the central warehouse and/or the vendors 210 to the retail stores.

The camera 202 captures an image (212). For example, an articulating camera captures multiple images of the retail store and provides the images to the analytics system 204.

The analytics system 204 identifies product facings (214) in the captured image. For example, the analytics system 204 queries an image database to determine the number, size, and location of the product facings associated with the specific image captured by the camera 202.

The analytics system 204 divides the image into macroblocks (216) where the macroblocks correspond to the product facings. For example, there is a one to one correlation between the product facings and the macroblocks. In another example, some of the macroblocks correspond to multiple product facings.

In some implementations, the analytics system 204 divides the macroblocks into sub-macroblocks so that each product facing is associated with two or more sub-macroblocks. The size of the sub-macroblocks is based on the size of the product facing. Alternatively, each sub-macroblock is one pixel.

The analytics system 204 determines a color of each of the macroblocks (218). For example, the analytics system 204 identifies the principal color that occurs most frequently in each of the macroblocks or the pixel color with the greatest percentage of area in each of the macroblocks. In some implementations, the analytics system 204 identifies multiple colors associated with each macroblock.

Alternatively, the analytics system 204 identifies a color for each of the sub-macroblocks. When each sub-macroblock is a pixel, the color is the color of the pixel. When each sub-macroblock includes multiple pixels, the color is the principal color of the sub-macroblock, such as the color that occurs most frequently in the sub-macroblock.

The analytics system 204 compares the color with a shelf color (220) or a product color. For example, the analytics system 204 determines if the principal color of the macroblock is the same as the shelf color or a color of the product associated with the macroblock (e.g., the product represented by the product facing).

The analytics system 204 determines a current stock level of a product (222) based on the comparison. For example, the analytics system 204 determines that the product is in stock if the principal color of the macroblock is the same as the product color of the product associated with the macroblock. In another example, the analytics system 204 determines that the product is out of stock if pixel color with the greatest percentage of area in the macroblock is the same as the shelf color.

In some implementations, the analytics system 204 compares the colors of the sub-macroblocks with the shelf color of the product color and determines a current stock level based on the comparison. For example, based on the percentage of sub-macroblocks that have the same color as the product color, the analytics system 204 determines a current stock level (e.g., the same percentage times a maximum stock level of the product).

The analytics system 204 presents the current stock level (224). For example, the analytics system 204 presents the current stock level of the product in a graphical user interface. In some implementations, the analytics system 204 combines all of the current stock levels for macroblocks associated with the same product to determine the overall stock level for the product or an out of stock percentage of the product. The out of stock percentage is based on the number of macroblocks that indicate the product is out of stock and the maximum stock level of the product.

In certain implementations, the analytics system 204 identifies the macroblocks associated with the same product based on information in an image database. For example, each macroblock is associated with a location in the captured image, and the image database indicates the locations that are associated with the same product.

In some implementations, the checkout 206 processes one or more transactions (226) and the inventory system 208 updates product inventory (228). For example, the inventory system 208 updates an inventory database based on the products sold, returned, or exchanged during the transaction.

The inventory system 208 determines a calculated stock level (230) for each of the products sold by the retail store. For example, the inventory system 208 determines the number of products available for purchase based on the sales, returns, and exchanges at the retail store compared to the total number of products at the retail store. For example, an item that was returned because of damage to the item is not available for purchase and is not included in the calculated stock level.

The analytics system 204 compares the current stock level and the calculated stock level (232). For example, the analytics system 204 requests the calculated stock level from the inventory system 208 and determines if there is a difference between the calculated stock level and the current stock level.

The analytics system 204 optionally presents the comparison between the current stock level and the calculated stock level to a user. In some implementations, the comparison is presented if the current stock level and the calculated stock level are not the same and the comparison is not presented otherwise.

The analytics system 204 provides an updated stock level to the inventory system 208 (234) and the inventory system updates the calculated stock level (230). For example, when the analytics system 204 determines that there is a discrepancy between the current stock level for a product and the calculated stock level for the product, the inventory system changes the calculated stock level to the value of the current stock level for the product.

The analytics system 204 orders an additional quantity of the product (238). For example, the analytics system 204 determines that the current stock level of a product is below a threshold stock level for the product and requests that the vendors 210 deliver the additional quantity of the product to the retail store.

The vendors 210 receive the product order (240) and provide the requested products to the retail store. For example, the vendors that supply the requested product fulfill the order.

Figure 3A:
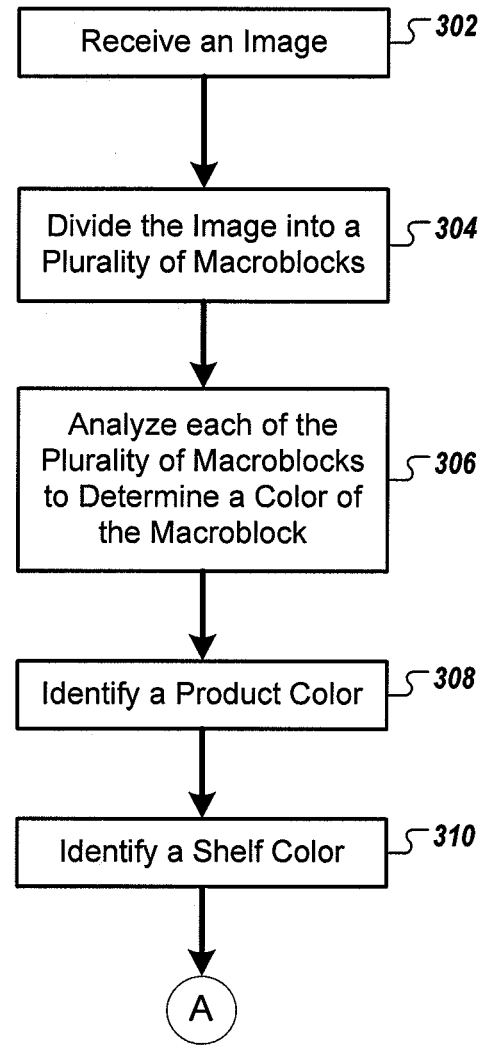
FIGS. 3A-B show a flow chart of an example process for presenting a stock level.
Figure 3B:
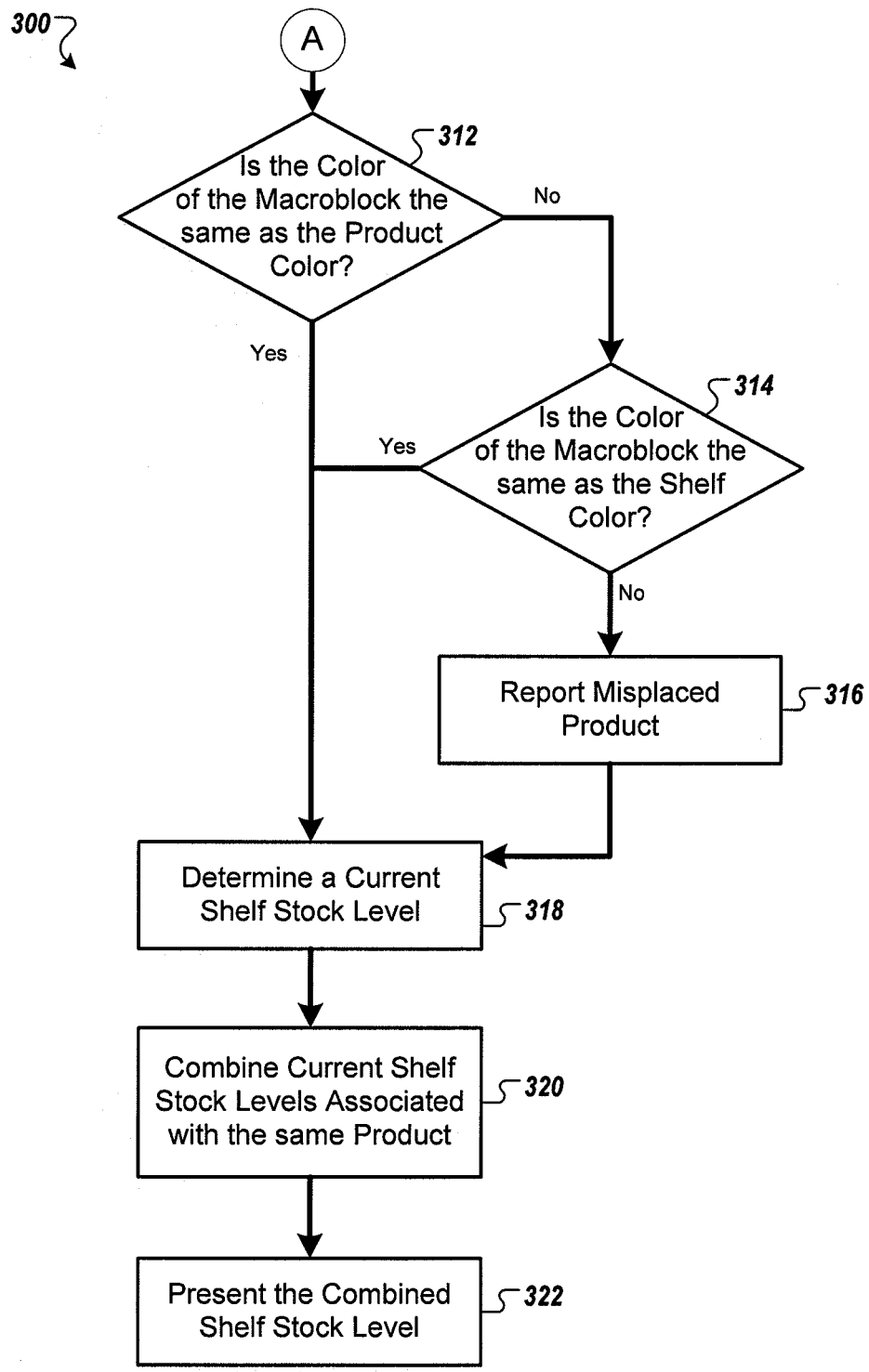

FIGS. 3A-B show a flow chart of an example process 300 for presenting a shelf stock level. The supply chain environment 100 and parts thereof will be referred to in the following as examples. In other implementations, the process 300 is performed by other environments or systems in conjunction with or instead of the supply chain environment 100.

An image analysis module receives (302) an image. For example, the image analysis module 118 receives an image from a stationary camera (e.g., the camera 112).

The image analysis module divides (304) the image into a plurality of macroblocks. For example, the image analysis module 118 uses metadata associated with the image to determine the retail store and the camera the image was received from. For example, the image includes the IP address of the camera that captured the image and the image analysis module 118 determines the store, department, and/or aisle that was captured in the image based on the IP address. Using the metadata, the image analysis module 118 determines the layout of the macroblocks in the image, e.g., by querying a database that associates the camera IP address with macroblock layouts.

The image analysis module analyzes (306) each of the plurality of macroblocks to determine a color of the macroblock. For example, the image analysis module 118 identifies the color that occurs most frequently in the macroblock. In some implementations, the image analysis module 118 groups similar colors and determines a color based on the group of colors associated with the greatest percentage of pixels in the macroblock. In certain implementations, the image analysis module 118 identifies the two colors that occur most frequently in the macroblock. In one example, the image analysis module 118 determines a color for each sub-macroblock associated with a specific macroblock.

An out of stock determination module identifies (308) a product color. For example, the out of stock determination module 120 identifies a product associated with one of the macroblocks in the image. A product facing associated with the product is captured in the image and associated with a macroblock based on the macroblock in the image that contains the image of the product facing. The product color identified by the out of stock determination module 120 is associated with the identified product.

The out of stock determination module identifies (310) a shelf color. For example, the out of stock determination module 120 identifies the color of the shelf in the captured image.

The out of stock determination module determines (312) if the color of the macroblock is the same as the product color. For example, the out of stock determination module 120 receives the macroblock color from the image analysis module 118 and compares the macroblock color to the product color. If the out of stock determination module 120 determines that the macroblock color is the same as or similar to the product color, the process 300 proceeds with step 318. Alternatively, the out of stock determination module 120 compares the color of a sub-macroblock with the product color.

If the macroblock color is different from the product color, the out of stock determination module determines (314) if the color of the macroblock is the same as the shelf color. For example, the out of stock determination module 120 determines that the macroblock color is the same as the shelf color and no products are placed on the shelf, and the process 300 proceeds with step 318. Alternatively, the out of stock determination module 120 compares the color of a sub-macroblock with the shelf color.

If the out of stock determination module determines that the macroblock color is different from the product color and the shelf color, then the out of stock determination module reports (316) a misplaced product. For example, the out of stock determination module 120 reports that a product is on the wrong shelf to the reporting module 122 and the reporting module 122 presents a misplaced product report to an employee of the retail store.

The out of stock determination module determines (318) a current shelf stock level. For example, the out of stock determination module 120 determines a current shelf stock level associated with the current macroblock being analyzed. In some implementations, the current stock level is a Boolean value, e.g., "in stock" (e.g., 1) or "not in stock" (e.g. 0) based on the determination during step 312, e.g., "in stock" for yes and "not in stock" for no.

In some implementations, the out of stock determination module 120 determines a stock percentage or an out of stock percentage based on the color of the macroblock. For example, the out of stock determination module 120 determines that the macroblock color and the product color are the same, and that 73% of the macroblock is the macroblock color. The out of stock determination module 120 then determines that around 73% of the product is in stock, or similarly around 27% of the product is out of stock. In certain implementations, the out of stock determination module 120 multiplies the stock percentage or out of stock percentage by the maximum stock associated with the macroblock to determine a stock quantity or out of stock quantity associated with the macroblock (rounding to a whole number).

In other implementations, the out of stock determination module 120 determines the out of stock percentage or the stock percentage based on the color of the sub-macroblock.

The out of stock determination module combines (320) the current shelf stock levels associated with the same product. For example, the out of stock determination module 120 identifies all macroblocks that are associated with the same product based on macroblock locations associated with the product. The out of stock determination module 120 combines the current stock levels associated with the identified macroblocks to determine a combined shelf stock level (e.g., a whole number or percentage) for the product.

A reporting module presents (322) the combined shelf stock level. For example, the reporting module 122 receives the combined shelf stock level from the out of stock determination module 120 and presents the combined shelf stock level in a user interface. In some implementations, the user interface includes an option to order additional products from a vendor based on the out of stock percentage of the product.

Figure 4A:
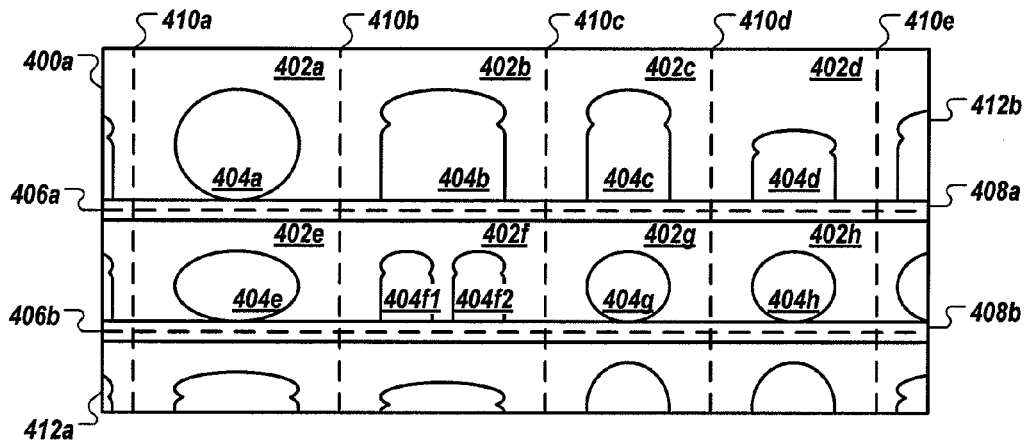
FIGS. 4A-C are example images of product facings.
Figure 4B:
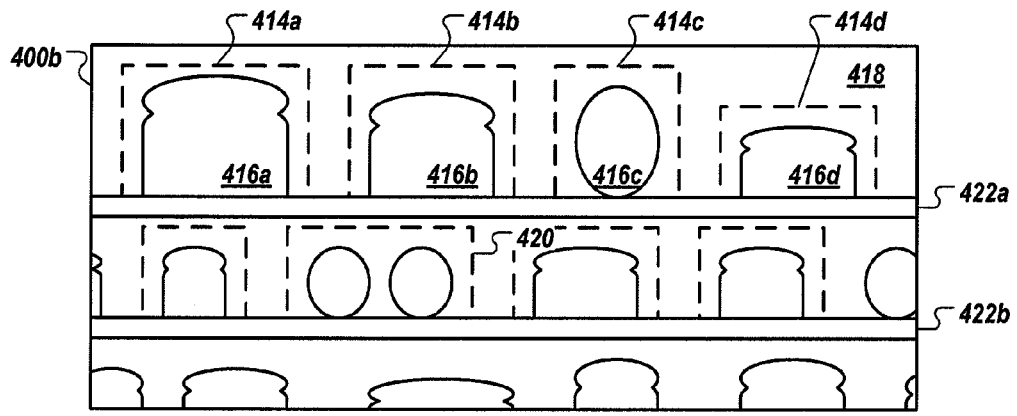
Figure 4C:
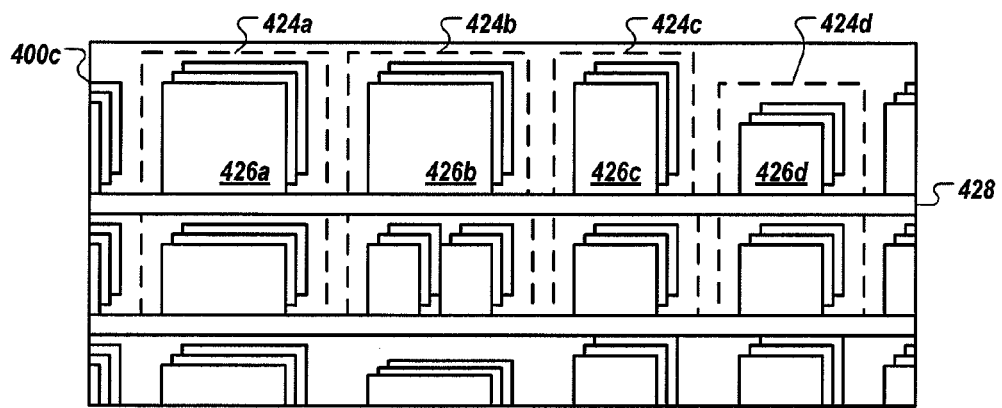

FIGS. 4A-C are example images 400a-c of product facings. The images 400a-c are divided into macroblocks associated with the product facings. For example, the image analysis module 118 receives the image 400a from the camera 112 and based on an identifier associated with the image 400a, divides the image 400a into a plurality of macroblocks 402a-h (indicated by the dashed lines) associated with a plurality of product facings 404a-h in the image 400a.

In this example, the image analysis module 118 divides the image 400a into a grid of macroblocks, where the space between one or more horizontal lines 406a-b in the grid is based on the distance between one or more shelves 408a-b in the image 400a. The distance between the horizontal lines 406a-b can be different for each pair of adjacent horizontal lines based on varying distances between the shelves 408a-b.

The distance between one or more vertical lines 410a-e included in the grid is based on the distance between adjacent products on a shelf. For example, products with a smaller width are optionally grouped in one vertical column and products with a greater width are optionally grouped in a different vertical column such that the vertical lines 410a-e of the grid pass between the vertical columns.

In some implementations, the image 400a includes one or more partial product facings 412a-b. For example, the camera 112 captures an image of the product shelves 114 and the size of the image 400a does not correspond exactly with the horizontal lines 406a-b and/or the vertical lines 410a-e.

In certain implementations, a single macroblock corresponds with more than one product facing. For example, the macroblock 402f includes the two product facings 404f1 and 404f2 in the image 400a. The number of product facings associated with a macroblock is optionally based on the horizontal lines 406a-b and the vertical lines 410a-e of the grid associated with the image 400a.

In some implementations, the image 400b is divided into one or more macroblocks 414a-d, where the size of the macroblock is based on the size of one or more product facings 416a-d associated with the macroblocks, as shown in FIG. 4B. For example, the size of the macroblock 414a corresponds with the size of the product facing 416a and the size of the macroblock 414c corresponds with the size of the product facing 416c. For example, the ratio between the size of the macroblock 414c and the size of the macroblock 414a is greater than about 1:2.

In this example, the macroblocks 414a-d are selected such that a minimal amount of white space is (e.g., space around the product facings 416a-d in the image 400b) is included in the macroblocks 414a-d. For example, a white space 418 around the macroblock 414d is not included in any of the macroblocks 414a-d.

The macroblocks 414a-d do not correspond to a grid with vertical and horizontal lines. For example, the image analysis module 118 is unable to place a vertical line that extends across the image 400b between the macroblock 414a and the macroblock 414b because of the location of a macroblock 420. In this example, the location of the macroblocks 414a-d corresponds to the location of the products on one or more shelves 422a-b, where the products do not line up in vertical columns on the shelves.

In some implementations, the edges of the macroblocks 414a-d touch the edges of the neighboring macroblocks. For example, an edge of the macroblock 414a is adjacent to an edge of the macroblock 414b.

The image analysis module 118 uses the macroblocks 414a-d in order to identify a color associated with the macroblocks that is indicative of a product on the shelves 422a-b. The out of stock determination module 120 receives the macroblock colors and determines a shelf stock level associated with the product facing of the products expected to be positioned on the shelves 422a-b.

In certain implementations, the image analysis module 118 divides each of the macroblocks 414a-d into a plurality of blocks (e.g., each macroblock is divided into sub-macroblocks with a size smaller than the original macroblocks). For example, the image analysis module 118 determines the color of each of the sub-macroblocks associated with a specific macroblock. The out of stock determination module 120 compares the colors of the sub-macroblocks with a color of a product or a color of the shelf 422a to determine a shelf stock level associated with the product.

If the percentage of sub-macroblocks that have a different color than the product color is greater than a threshold value (e.g., thirty percent), the out of stock determination module 120 determines that the product is out of stock. Alternatively, if the out of stock determination module 120 identifies a threshold number or threshold percentage of sub-macroblocks that have the same color as the product color, the out of stock determination module 120 determines that the product is in stock. In certain implementations, the out of stock determination module 120 identifies a stock level or a stock percentage based on the color of the sub-macroblocks.

In some implementations, one or more macroblocks 424a-d in the image 400c include multiple product facings 426a-d that are stacked back from the front of the corresponding shelf, as shown in FIG. 4C. For example, the macroblock 424d is associated with three product facings 426d.

In these implementations, the image analysis module 118 determines a percentage of a color associated with the macroblocks 424a-d. For example, the image analysis module identifies all of the colors in the macroblock 424a and the percentage of the area in the macroblock 424a that is associated with the respective color. The out of stock determination module 120 uses the color with the highest percentage associated with the macroblock 424a to determine the current stock level of a product associated with the product facing 426a. For example, the out of stock determination module 120 receives the color of the product associated with the product facing 426a and the maximum quantity of the product that fits on a shelf 428, and based on the percentage of the macroblock color that matches the product color, the out of stock determination module 120 identifies an out of stock percentage of the product and an out of stock quantity of the product.

In certain implementations, the out of stock determination module 120 receives information about all of the colors included in the macroblock 424a and the associated percentages. In these implementations, the out of stock determination module 120 determines if the product color associated with the macroblock 424a does not occur most frequently in the macroblock 424a (e.g., and the shelf color does instead). Based on the frequency of the product color, the out of stock determination module 120 identifies an out of stock percentage or an in stock percentage of the product associated with the macroblock 424a.

In some implementations, the image analysis module 118 identifies the position of the macroblocks 424a-d based on object recognition. For example, the image analysis module 118 receives information that indicates the relative positions of the macroblocks 424a-d with respect to each other and the image analysis module 118 determines the locations of the macroblocks 424a-d with respect to the image 400c.

For example, if a field of view of the camera 112 is slightly different than a predetermined field of view (e.g., based on pan, or tilt), the locations of the macroblocks 424a-d in the image 400c may be different from the predetermined locations of the macroblocks 424a-d. The image analysis module 118 analyzes the image 400c in order to determine if the field of view of the camera 112 is the same as the predetermined field of view and the macroblocks 424a-d are in the predetermined locations (e.g., based on x and y coordinates in the image). If the locations of the macroblocks 424a-d are different, the image analysis module 118 may provide the camera 112 with parameter adjustments that will return the field of view of the camera 112 to the predetermined field of view.

Figure 5:
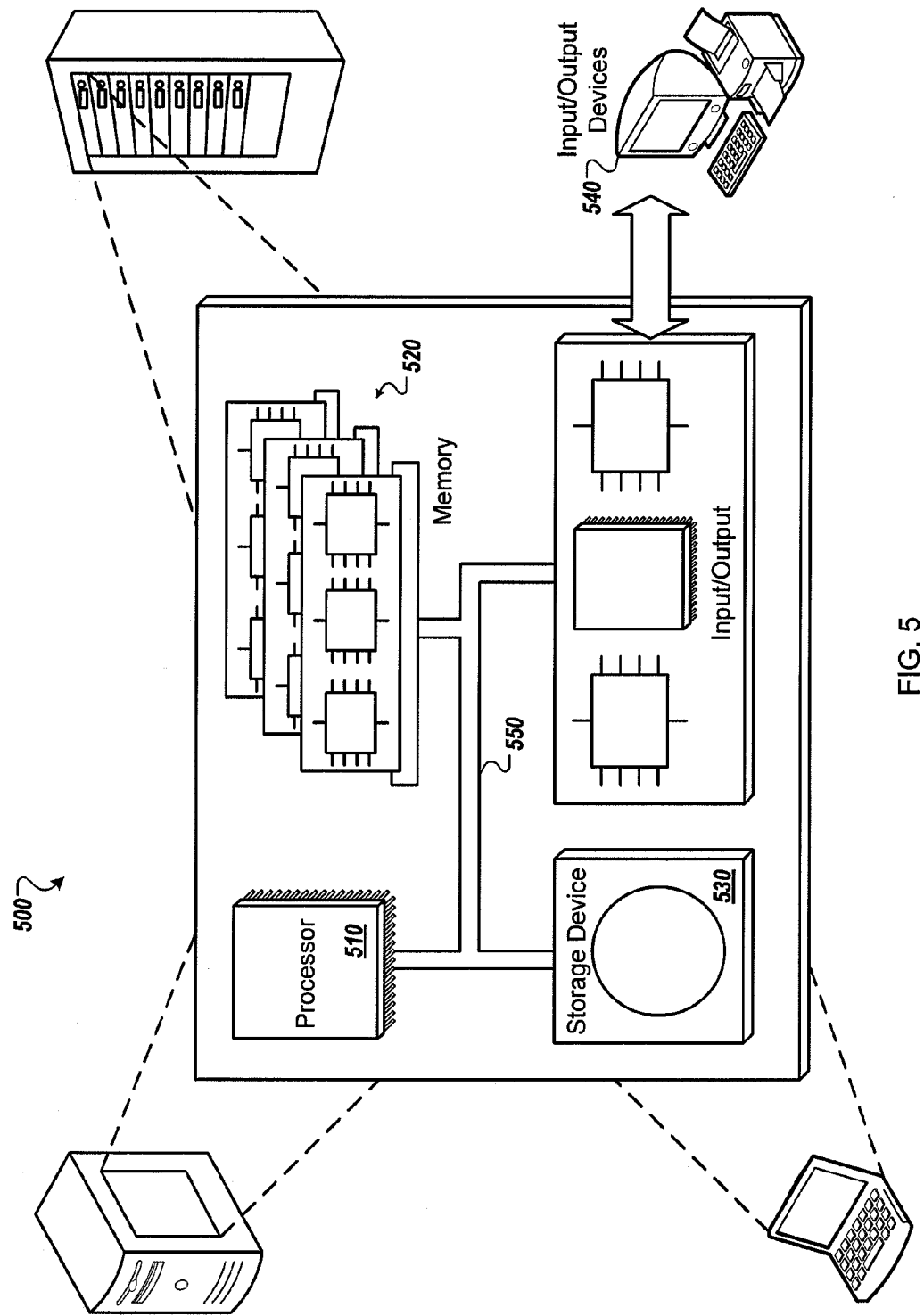
FIG. 5 is a block diagram of a computing system optionally used in connection with computer-implemented methods described in this document.

FIG. 5 is a schematic diagram of a generic computer system 500. The system 500 is optionally used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 is optionally a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A method comprising:
    receiving an image from a camera, wherein the image is of a retail environment;
    dividing the image into a plurality of macroblocks, wherein each of the macroblocks is sized corresponding to a size of a product facing on a shelf in the retail environment;
    analyzing each of the plurality of macroblocks in the image to determine a color of the macroblock;
    identifying a product color of a product provided by the retail environment, wherein the product and the product color are associated with one or more of the product facings represented by the plurality of macroblocks and wherein the product color differs from a shelf color;
    comparing the color of each of the plurality of macroblocks to the product color or the shelf color, wherein each of the plurality of macroblocks that corresponds to the product color represents a location of a product facing on a shelf in the retail environment;
    determining, based on the comparing, a current stock level of the product provided by the retail environment; and
    presenting the current stock level of the product provided by the retail environment in a graphical user interface on a display.

2. The method of claim 1, wherein the determining comprises:
    identifying a subset of the plurality of macroblocks, wherein each of the macroblocks in the subset of the plurality of macroblocks is associated with the product provided by the retail environment;
    identifying a maximum stock level of the product provided by the retail environment;
    identifying a portion of the subset of the plurality of macroblocks, wherein the color of each of the macroblocks in the portion of the subset of the plurality of macroblocks is the same as the shelf color; and
    determining an out of stock percentage of the product provided by the retail environment, wherein the out of stock percentage is based on the maximum stock level of the product and a number of macroblocks in the portion of the subset of the plurality of macroblocks, and wherein the current stock level is based on the out of stock percentage of the product.

3. The method of claim 2, wherein each of the macroblocks in the subset of the plurality of macroblocks comprises a location within the image, and wherein identifying the subset of the plurality of macroblocks comprises identifying the locations of the macroblocks associated with the product provided by the retail environment.

4. The method of claim 2, further comprising comparing the out of stock percentage of the product with a threshold out of stock percentage to determine if the out of stock percentage of the product is greater than the threshold out of stock percentage and wherein the presenting is based on the comparing of the out of stock percentage of the product with the threshold out of stock percentage.

5. The method of claim 2, wherein the presenting comprises displaying an order quantity of the product, wherein the order quantity of the product is based on the current stock level and the maximum stock level, the method further comprising:

ordering the order quantity of the product from a vendor; and presenting an order confirmation message on the display.

6. The method of claim 5, further comprising comparing the order quantity of the product with a threshold order quantity and wherein displaying the order quantity of the product is based on the comparing of the order quantity of the product with the threshold order quantity.

7. The method of claim 1, further comprising receiving, from an inventory system, a calculated stock level of the product and wherein the presenting comprises displaying a comparison of the calculated stock level of the product and the current stock level.

8. The method of claim 7, further comprising providing, to the inventory system, the current stock level.

9. The method of claim 1, wherein a first macroblock from the plurality of macroblocks has a first size corresponding to a first product facing of a first product and a second macroblock from the plurality of macroblocks has a second size corresponding to a second product facing of a second product, wherein the first product is different from the second product and the first size is smaller than the second size.

10. The method of claim 9, wherein a size ratio between the first size and the second size is greater than about 2:1.

11. The method of claim 9, wherein the first macroblock comprises a plurality of said first product facings of the first product.

12. The method of claim 11, wherein the current stock level comprises a ratio of product outs, wherein the ratio of product outs is based on the plurality of said first product facings of the first product and a maximum stock level of the first product.

13. A system comprising:
an image analysis module configured to receive a plurality of images of a retail store, wherein the image analysis module divides each of the images into a plurality of blocks of pixels, wherein the image analysis module determines a principal color associated with each of the plurality of blocks of pixels, and wherein each of the plurality of blocks of pixels is associated with a product provided by the retail store and an identifier, the identifier being representative of a region of the retail store, wherein each of the plurality of blocks of pixels including at least a portion of an image associated with the product includes multiple colors such that the principal color associated with the block of pixels is representative of a corresponding one of the products, and wherein each of the plurality of blocks of pixels is sized corresponding to a size of a product facing of the product on a shelf in the retail store;

an out of stock determination module configured to receive the principal colors and the identifiers associated with each of the plurality of blocks of pixels, wherein for each of the plurality of blocks of pixels the out of stock determination module identifies, based on the identifier associated with the block of pixels, a product color of the product associated with the block of pixels and a shelf color of the shelf the product is placed on, and compares the principal color of the block of pixels with the product color or the shelf color to determine an out of stock quantity for the product; and a reporting module configured to receive the out of stock quantity for the product, wherein the reporting module displays the out of stock quantity for the product on a monitor.

14. The system of claim 13, wherein the out of stock determination module identifies a subset of the plurality of blocks of pixels associated with a specific product provided by the retail store and determines a combined out of stock quantity of the specific product based on the out of stock quantities corresponding to the subset of the plurality of blocks of pixels associated with the specific product, and wherein the reporting module displays the combined out of stock quantity of the specific product on the monitor.

15. The system of claim 14, wherein the reporting module is configured to order the combined out of stock quantity of the specific product from a vendor.

16. The system of claim 15, wherein the reporting module is configured to display an order confirmation based on ordering the combined out of stock quantity of the specific product from the vendor.

17. The system of claim 15, wherein the image analysis module is configured to receive the plurality of images from a plurality of retail stores and the reporting module is configured to order the combined out of stock quantity of the specific product for each of the plurality of retail stores from the vendor.

18. The system of claim 13, wherein the image analysis module is configured to receive the plurality of images from a plurality of cameras physically located at the retail store and the out of stock determination module is configured to determine a first out of stock quantity for a first product facing based on a first image from the plurality of images and a second out of stock quantity for a second product facing based on a second image from the plurality of images.

19. The system of claim 18, wherein the reporting module displays the first out of stock quantity and the second out of stock quantity on the monitor.

20. The system of claim 18, wherein the first image is of a first region in the retail store and the second image is of a second region in the retail store and the first region is the same as the second region, wherein the first product facing and the second product facing are the same product facing, and the out of stock determination module is configured to average the first out of stock quantity and the second out of stock quantity when determining the out of stock quantity for the product.

* * * * *